(12) United States Patent
Mankiewicz

(10) Patent No.: US 6,390,399 B1
(45) Date of Patent: May 21, 2002

(54) HAND MILL

(76) Inventor: Jack Mankiewicz, Bosdorfer Strasse, 7 D-27367 Hellwege (DE)

( * ) Notice: Subject to any disclaimer, the term of this patent is extended or adjusted under 35 U.S.C. 154(b) by 0 days.

(21) Appl. No.: 09/367,546

(22) PCT Filed: Apr. 16, 1997

(86) PCT No.: PCT/EP97/01893

§ 371 Date: Feb. 9, 2000

§ 102(e) Date: Feb. 9, 2000

(87) PCT Pub. No.: WO97/39671

PCT Pub. Date: Oct. 30, 1997

(30) Foreign Application Priority Data

Apr. 20, 1996 (DE) .......................................... 196 15 788

(51) Int. Cl.⁷ .................................................. A47J 42/04
(52) U.S. Cl. .................................................... 241/169.1
(58) Field of Search ............................... 241/169.1, 169, 241/168

(56) References Cited

U.S. PATENT DOCUMENTS

| 2,407,808 A | 9/1946 | Bivans |
| 2,782,998 A | 2/1957 | Hastings, Jr. |
| 4,374,574 A | 2/1983 | David |
| 4,815,671 A | 3/1989 | Akira |
| 5,082,190 A | 1/1992 | Chen |

FOREIGN PATENT DOCUMENTS

| AT | 179958 | 10/1954 |
| DE | 806 040 | 6/1951 |
| DE | 2 222 865 | 11/1973 |
| DE | 28 18 216 | 11/1978 |
| DE | 27 47 059 | 5/1979 |
| DE | 8533929.6 | 3/1986 |
| DE | 36 90 785 | 10/1990 |
| FR | 842 769 | 6/1939 |

*Primary Examiner*—Mark Rosenbaum
(74) *Attorney, Agent, or Firm*—Shlesinger, Arkwright & Garvey LLP

(57) ABSTRACT

The invention relates to a manual grinder comprising a housing fitted with a sealable filling aperture for the material to be ground, furthermore a grinding unit with an adjustable set of grinding elements and a drive means for said set. The grinding unit (2) is set into rotation by a rotary grip (5) mounted on the housing (1) and by a flexible shaft (3) or articulating shaft mounted between the said rotary grip and the grinding unit (2). The ergonomic rotary grip (5) is illustratively mounted on the side of the grinder housing (1). The large filling aperture for the material to be ground is mounted separately from the filling aperture of the grinding unit and can be sealed by a stopper-like cover (6).

24 Claims, 8 Drawing Sheets

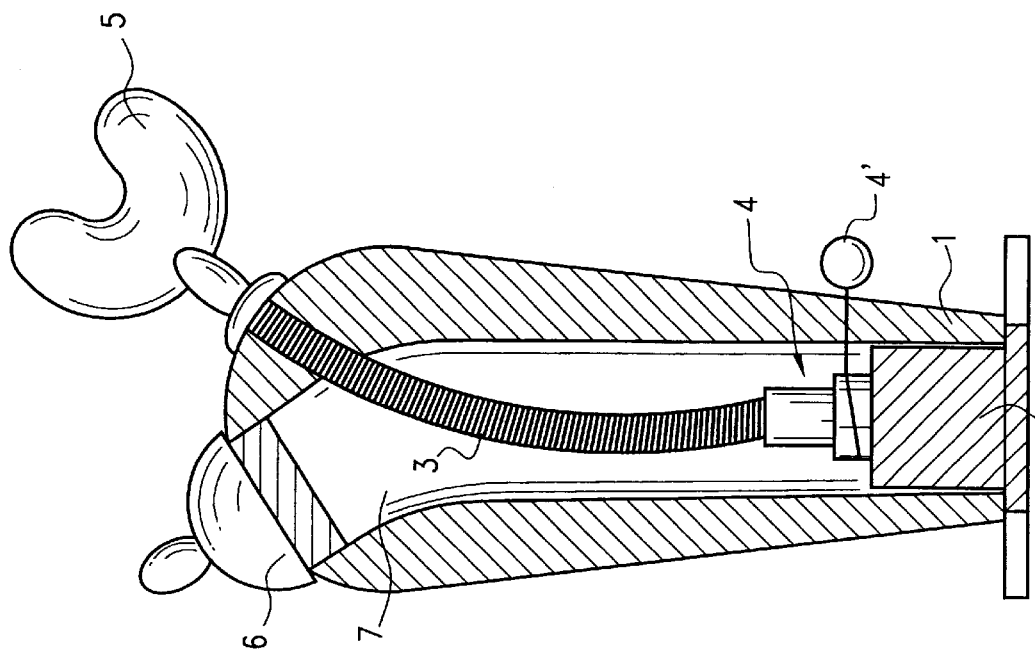
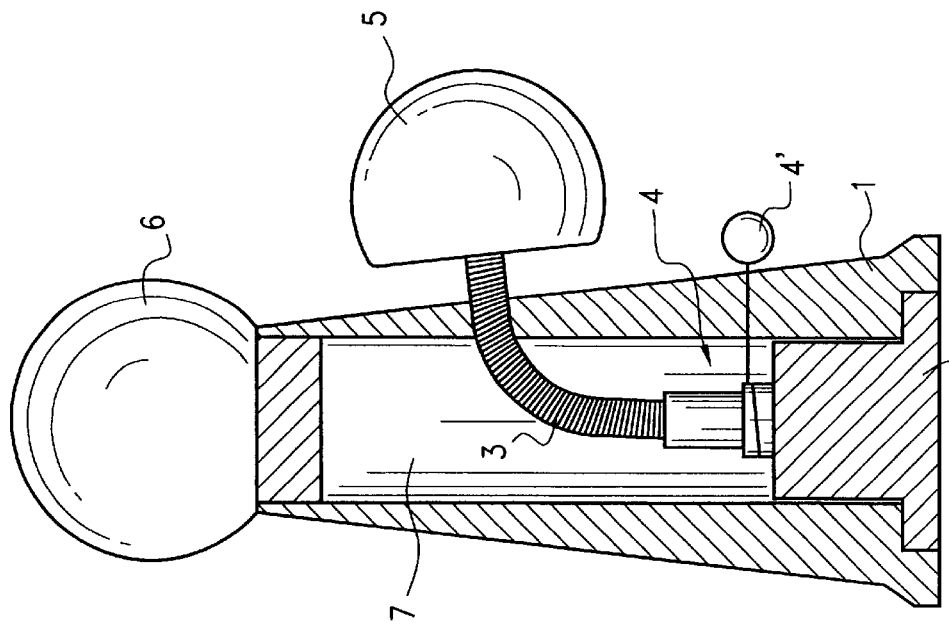
FIG.1
FIG.2

HAND MILL

CROSS REFERENCE TO RELATED APPLICATION

This application claims the priority of German Application No. 196 15 788.9, filed Apr. 20, 1996, and which is incorporated herein by reference.

FIELD OF THE INVENTION

The invention relates to a manual grinder of the species defined in the preamble of claim 1, in particular to grind spices such as pepper and salt, coffee beans, grains, herbs etc.

BACKGROUND OF THE INVENTION

The designs of known manual grinders (German patents 27 47 059; 28 18 216 and 36 90 785; U.S. Pat. No. 2,782,998; French patent 842 769 and Austrian patent 179 958) may be loosely described as follows:

A cylindrical, vertically configured container holding the material to be ground is received in a grinder housing. The set of grinding elements is located at the bottom and consists of a stationary grinding ring and a rotatable grinding cone. The grinding cone is affixed to the lower end of the drive shaft which runs vertically at the center of the container. The drive grip or crank is affixed to the upper end of the drive shaft. The grinding gap and hence the grinding granularity is adjusted by a screw-nut at one of the ends of the drive shaft. As regards spice grinders of earlier times, the grinding cone is kept in position by a dedicated screw.

The spice grinders of the known designs incur the following drawbacks:

It is impossible to accurately adjust the grinding gap in controlled and functional manner and therefore it is impossible to adjust the grinding granularity in simple, practical and effective manner. In some known grinders, the adjustment of the grinding gap requires a screwdriver and a wrench. In the process, the grinder must be kept between the knees or be held by another person. On this light the modern design using an adjusting screw at the top of a rotary handle would appear advantageous because the user can implement the adjustment merely using his/her hands. However difficulties arise in practice because this screw significantly hampers grinder operation. It is known to circumvent these drawbacks by appropriately shaping the screw, for instance making it flat, however also making it difficult to use it, or to mask it into a recess in the rotating grip, whereby however operation is also made significantly more difficult. In some manual grinders the screw-nut is hidden underneath the grinding unit, where it is even more cumbersome to reach and adjust.

If the grinder is desired to grind very finely, the screw must be tightened rather hard. As a rule the known grinders are without a scale or a visible adjustment stop. As a result, the adjusting nut often is excessively tightened. In such a case, it can hardly be rotated or it locks altogether. There is danger of damaging the set of grinding elements. Another drawback is that undesired, autonomous resetting of the screw nut cannot be fully precluded. This nut might draw tighter itself in the case of a well tensioned grinder, or it may further loosen if this grinder is adjusted loosely.

Container filling is laborious in the known manual grinders. The known containers must be laboriously screwed apart to allow filling and then be reassembled to become operational again.

Some manual grinders also can be filled through a side aperture. However this aperture is so small and difficult to access that for instance peppercorns must be loaded individually.

Furthermore the known grinders entail complex and laborious operation. The various functions such as filling, grinding and adjusting granularity are frequently not immediately recognized by the user. The grinders are "dirty" because a residue of the ground material stays behind on account of the grinder components at the bottom of the grinder or around the set of grinding elements and will drop on the support surface when the grinder is no longer used.

OBJECTS AND SUMMARY OF THE INVENTION

The objective of the present invention is to so improve a manual grinder of the initially cited kind that the above discussed drawbacks of the known grinders shall be precluded.

This problem is solved by the invention by the features of claim 1.

Advantageous and appropriate further developments are stated in the dependent claims.

In the invention, the grinding unit is sealed per se and fitted with an integrated grinding-gap adjusting device. This grinding unit is driven by a flexible shaft. The grinder shaft and the shaft of the drive grip may be mounted at a mutual angle.

In the design of the manual grinder of the invention, a grip to actuate the grinder is mounted to a side of the grinder housing and drives the grinding unit by means of the flexible shaft. The design of the invention improves significantly the functionality and handling of the manual grinder. At the top, previously reserved for the rotary grip or crank of the known manual grinders, there is now a large aperture which can be easily closed by a lid and which allows filling the container in problem-free manner. The manual grinder of the invention no longer requires being disassembled for filling. The granularity adjusting device of the invention is driven by an easily handled lever. This lever projects from a horizontal slot out of the grinder housing and illustratively can be moved through 120°, and optionally there may be a continuous range of adjustments or also three discrete adjustment positions for fine, medium and coarse granularities.

Markings may be used for such purposes on the housing. The range of lever rotation may be selected so it be out of the way when holding the grinder.

The functions and purposes of the operating components of the grinder of the invention are immediately recognizable. Any person at once understands where the rotary grip is located, where the grinder will be filled and how to adjust granularity.

The grinder of the invention allows grinding rapidly and effortlessly both small and large quantities of material because the rotary grip can be driven rapidly and effectively without fatigue, while also allowing slow and well controlled grinding. The grinder of the invention can be held as well as actuated ergonomically, in simple and convenient manner.

Lastly the manual grinder of the invention is also "clean", that is, it will hardly leave behind grinding residues when being set down. This feature is achieved in that the components which in the conventional designs are in the vicinity of the discharge aperture and which temporarily retain ground particles, are superfluous in the design of the invention and therefore are absent from the design of the invention.

The invention is elucidated below in relation to the attached drawing shown illustrative embodiments.

BRIEF DESCRIPTION OF THE DRAWINGS

FIG. 1 is a first embodiment of the invention of a manual grinder,

FIG. 2 is a second embodiment of the invention of a manual grinder,

Figure 4:
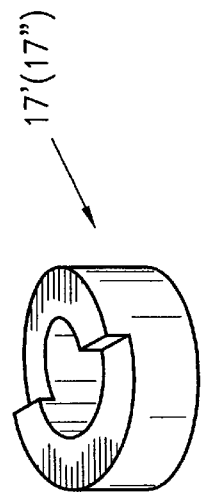
FIG. 4 is a detail of an adjusting device of the grinding unit used in the manual grinder.

Identical components shown in the Figures of the drawing are denoted by the same references.

DETAILED DESCRIPTION OF THE INVENTION

The manual grinder shown in the drawing consists of a grinder housing 1 of arbitrary shape. The grinder housing comprises a grinding unit 2 driven through a rotary grip 5 and a flexible shaft 3, this flexible shaft running sideways out of the grinder housing as shown in FIGS. 1 and 2.

A comparatively large filling aperture for the material to be ground is present in the upper portion of the grinder housing and can be sealed by a plug-like cover 6.

The grinding unit is fitted with a granularity adjustment device 4 driven by a lever 4'. In manner known per se, the grinding unit is located at the lower end of the housing 1.

Figure 3:
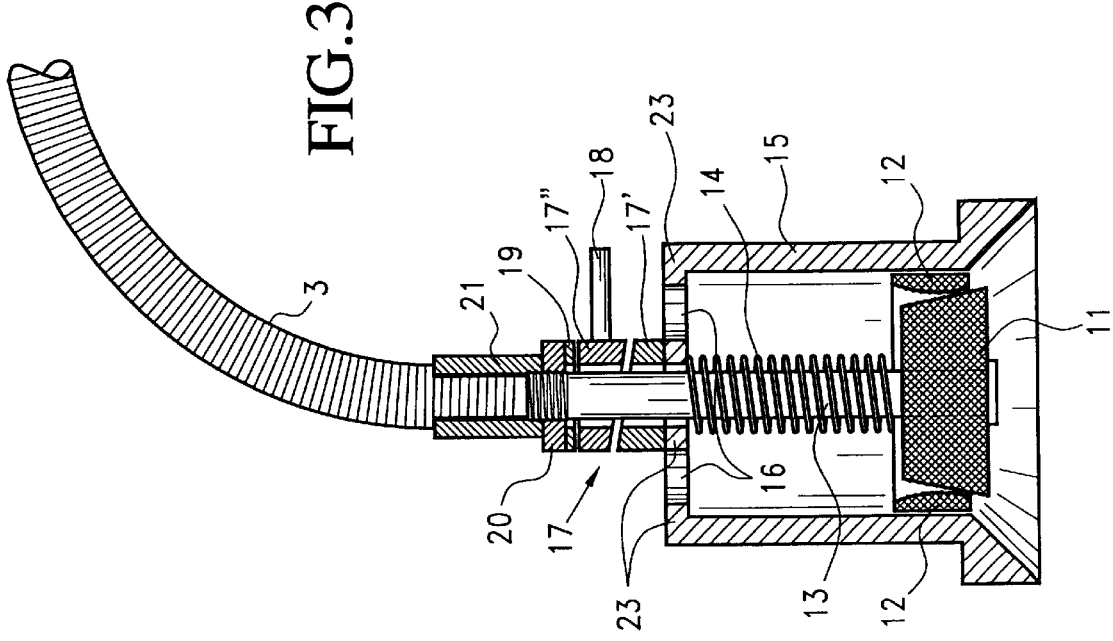
FIG. 3 shows a grinding unit used in the grinder of FIGS. 1 and 2.

FIG. 3 shows the grinding unit in greater detail. This grinding unit comprises a casing 15 made of a metal such as bronze or aluminum or of an appropriate industrial plastic. A set of grinding elements consists of a grinding ring 12 and a grinding cone 11 illustratively being made of hardened steel to grind pepper and other spices or herbs. As regards salt grinders, special plastic sets of grinding elements may be used. Obviously other designs of sets of grinding elements may also be used.

The grinding cone 11 is fitted with a drive shaft 13 comprising at its lower end a screwdriver-slot or a socket for a hexagonal wrench to facilitate assembly and to more accurately adjust the grinding.

The grinding-unit casing 15 is pot-shaped, its upper sealing wall 23 comprising circularly arrayed boreholes 16 (apertures) to pass the material being ground. The grinding-unit shaft 13 is centrally supported in the upper sealing wall 23 passes through a grinding-gap adjusting device 17 and is screwed by its upper free end into a cylindrical part 11 with an inside thread. The end of the flexible shaft 3 is inserted into the opposite end of this cylindrical part 11 to which it is irrotationally affixed, for instance in tetragonal manner and/or by force-fit and/or by welding. A preferably self-locking safety nut 20 screwed onto the drive shaft 13 is located between the adjusting device 17 and the cylindrical part 11 to irrotationally clamp the drive shaft 13 to the cylindrical part 21 and thereby to irrotationally connect it to the flexible shaft 3.

Preferably a washer 19 is also mounted between the safety nut 20 and the adjusting device 17.

The adjusting device 17 consists of a lower cylindrical element 17' firmly joined to the upper sealing wall 23 and of a freely rotatable element 17" mounted above. The mutually facing slide surfaces of these two elements 17' and 17" are approximately semi-circular sloping surfaces (see FIG. 4 diagrammatically showing one of the two elements). When rotating the upper part 17" by means of a rotary lever 18 firmly affixed to such a part, the drive shaft 13 and thereby the grinding cone 11 is adjusted in height to set the grinding gap between the grinding cone 11 and the grinding ring 12.

A compression spring 14 is mounted between the grinding cone 11 and the upper sealing wall 23 to assure or enhance problem-free displacement of the grinding cone into a position enlarging the grinding gap, this spring biasing the grinding cone 11 downward into the direction of opening the grinding gap.

The above described grinding unit is sealed per se. In a further development of the invention, the remote danger of the setting lever being hampered in its displacement by material being ground entering the adjusting device can be eliminated by using a metallic or plastic lid (omitted).

Figure 5:
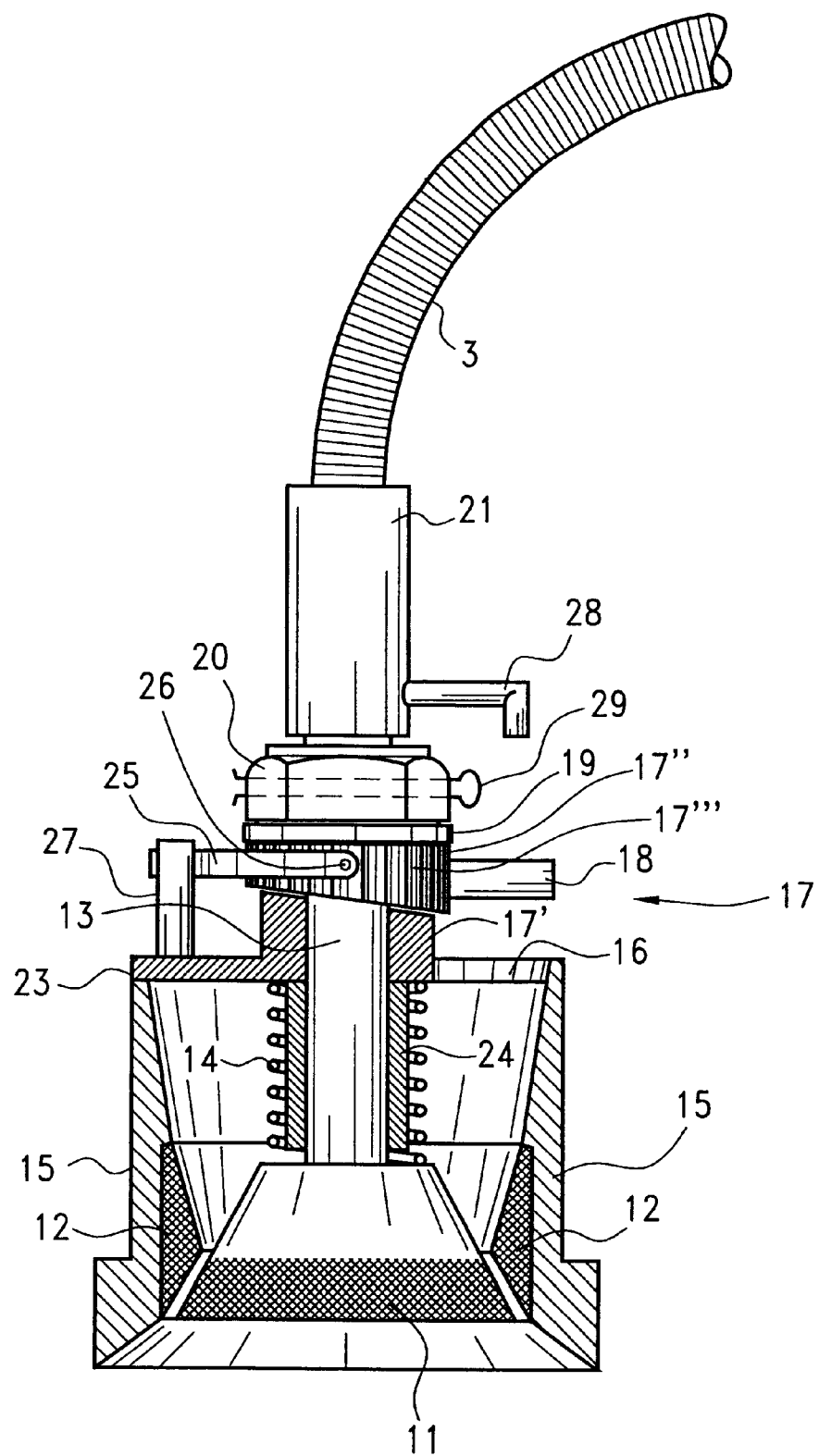
FIGS. 5, 6, 7 show a third embodiment of a manual grinder of the invention.
Figure 7:
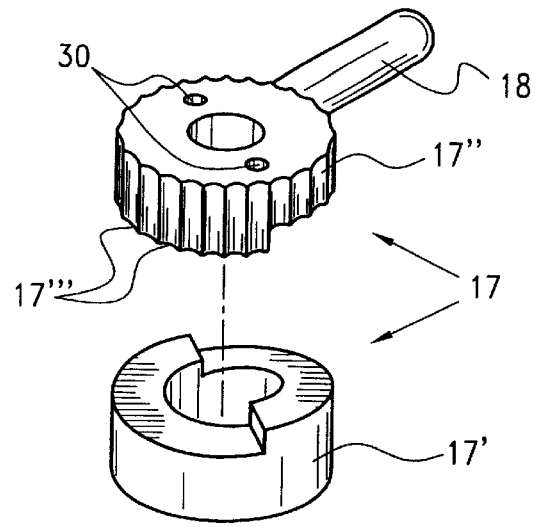
Figure 6:
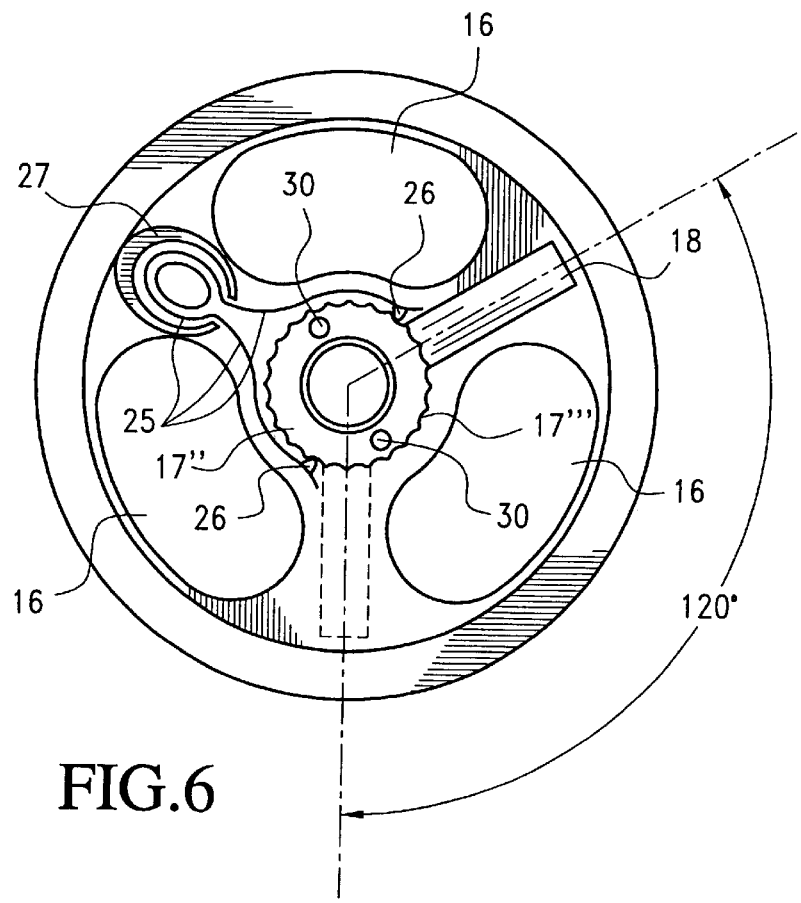

FIGS. 5 through 7 shown another embodiment of a manual grinder wherein the drive shaft 13 is supported in a bush 24 entering the casing 15 of the set of grinding elements and firmly affixed to the casing 15 or being integral with it. The bush 24 absorbs the stress exerted by the flexible shaft 3 on the grinding unit 2. Moreover the bush minimizes the radial play of the grinding cone 11, thereby assuring that the set of grinding elements shall operate highly accurately, in adjustable, quiet and friction-free manner.

The upper part 17" of the adjusting device 17 is fitted with axial, corrugated grooves 17''' entered by diametrically opposite bosses 26 of two arms of a leaf spring 25 enclosing a range for instance of at least 180°, said leaf spring being held in a leaf-spring support 27 mounted in the casing 15. Such a detent action precludes undesired setting of the adjusting device 17 and allows setting the granularity of the material being ground in discrete, specified steps.

The apertures for the material to be ground are denoted by the reference 16. The boreholes at the top side of the upper element 17" are denoted by 30 and will be elucidated below. The nut 20 comprises a borehole for a securing pin 29. This nut is used to pre-set or initially set the grinding gap, and upon such setting, the shaft 13 is fitted with a borehole aligned with that of the nut. For a lasting setting, the securing pin 29 is made to pass through both boreholes and then is secured. In this manner undesired setting of the grinding unit in operation and the danger of damage to the grinding unit by friction between grinding ring and grinding cone—as frequently experienced with manual grinders presently on the market—are reliably precluded.

A stirrer arm 28 to stir or displace the material being ground may be mounted to the cylindrical part 21 which in turn may be designed as a screw nut or to the nut 20 or to the securing pin 29. As a result, it is possible to prevent the material to be ground from accumulating and blocking further feed to the grinding unit, or to clear such blockage.

Figure 8:
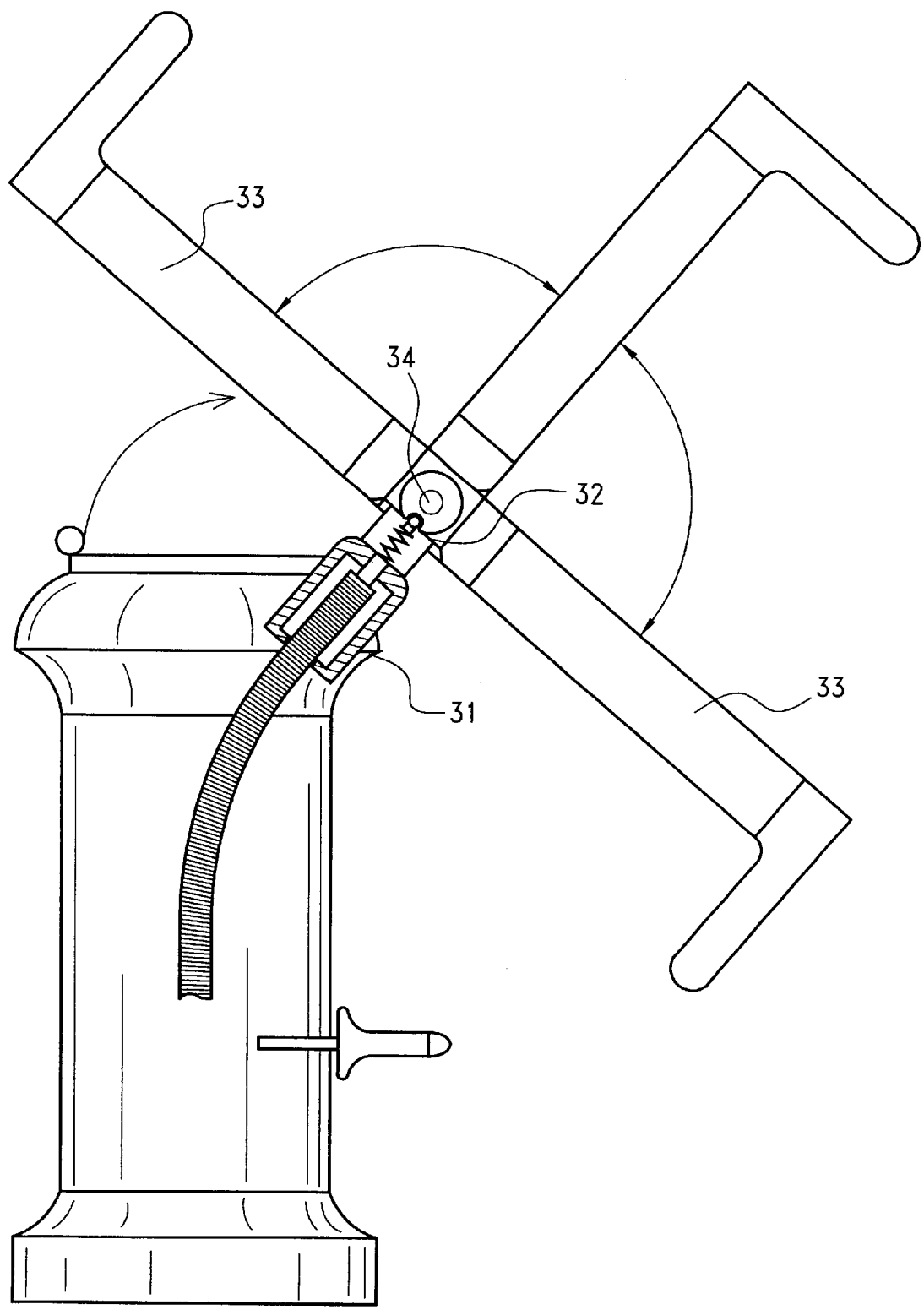
FIG. 8 shows a special design of a drive means of a manual grinder of the invention.

The manual grinder's drive means may be fitted with a free-running device 31 mounted in the grinder housing 1 and preferably situated between the grip 5, 33 and the flexible shaft 3 or articulating shaft as shown in FIG. 8. In this design the grip 33 may be connected to the free-running device 31 so as to be pivotable about an axis 34 and it may be a crank, as a result of which, depending on the grip position, operation is possible as a plain rotary grip (position I) or in pivoted manner as a drive crank (position II) or as a rocking grip (position III) as indicated in FIG. 8.

As regards FIGS. 9 through 12, the embodiment concerns manual grinders fitted with a rigid drive shaft 43 making use of the grinding unit of FIGS. 1 through 8.

Figures 9, 10:
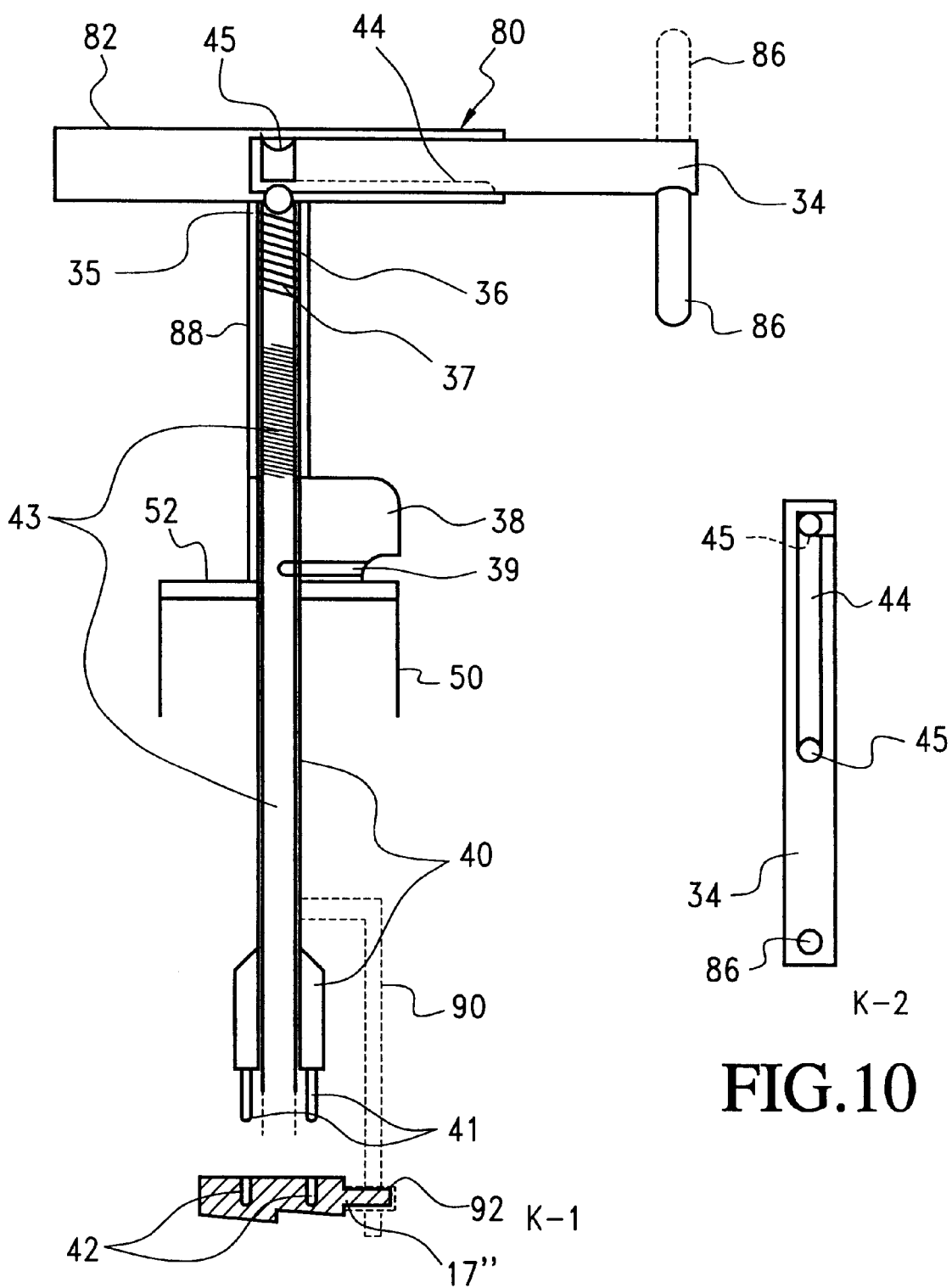
FIGS. 9, 10 are further embodiments of the manual grinder of the invention.

As regards the manual grinder of FIG. 9, the drive shaft 43 is mounted vertically and at the center of the grinder housing 50. An omitted, arcuate filling aperture is present in the upper sealing wall 52 of this housing and is fitted with a sliding seal. The granularity adjusting device 17 is actuated by a lever 38 mounted above the wall 52 and irrotationally affixed to a cylindrical tube 40 which encloses the drive shaft 43 and is fitted at its lower end with two pins 41 entering boreholes 42 in the upper element 17" of the granularity adjusting device 17, said boreholes already having been described in relation to FIGS. 5 through 7 as boreholes 30.

Instead of being actuated by the two pins 41 and the boreholes 42, the upper element 17" of the adjusting device 17 may be driven by an angle arm 90 affixed to the tube 40 and loading a lever 92 which corresponds to the adjusting lever 18 affixed to the element 17". For that purpose the angle arm may comprise a fork at its free end to span the lever 92. This configuration is indicated by the broken lines in FIG. 9.

Figure 11:
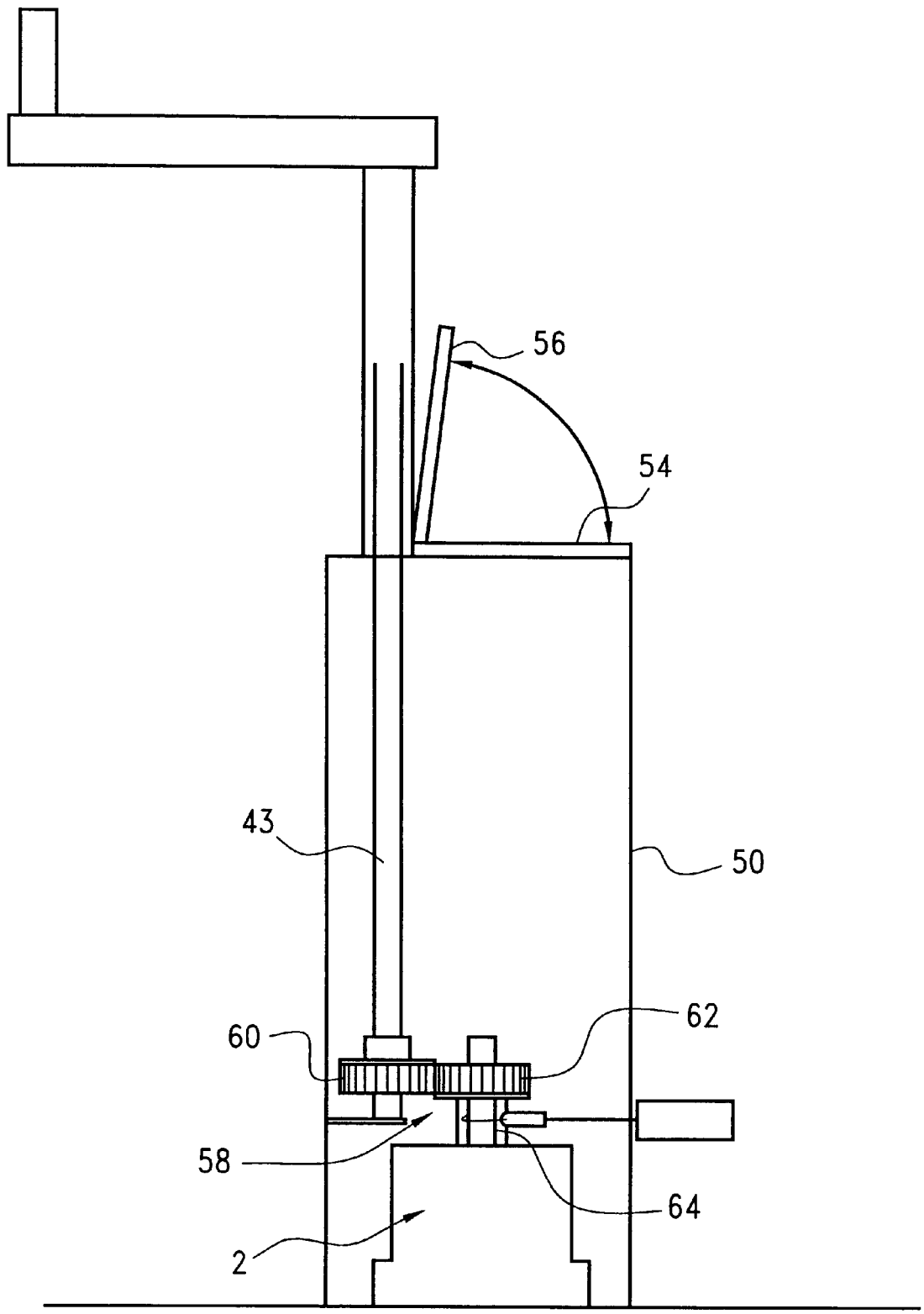

In the embodiment of FIG. 11, the drive shaft 43 is mounted excentrically near the edge of the grinder housing 50. This design allows a larger filling aperture 54 that can be sealed by a pivotable lid 56. A gear system 58 is used to drive the grinding unit 2, one gear 60 being mounted on the rigid drive shaft 43 and the other gear 62 being seated on a shaft 64 of the grinding unit 2 or of its grinding cone 11.

Figure 12:
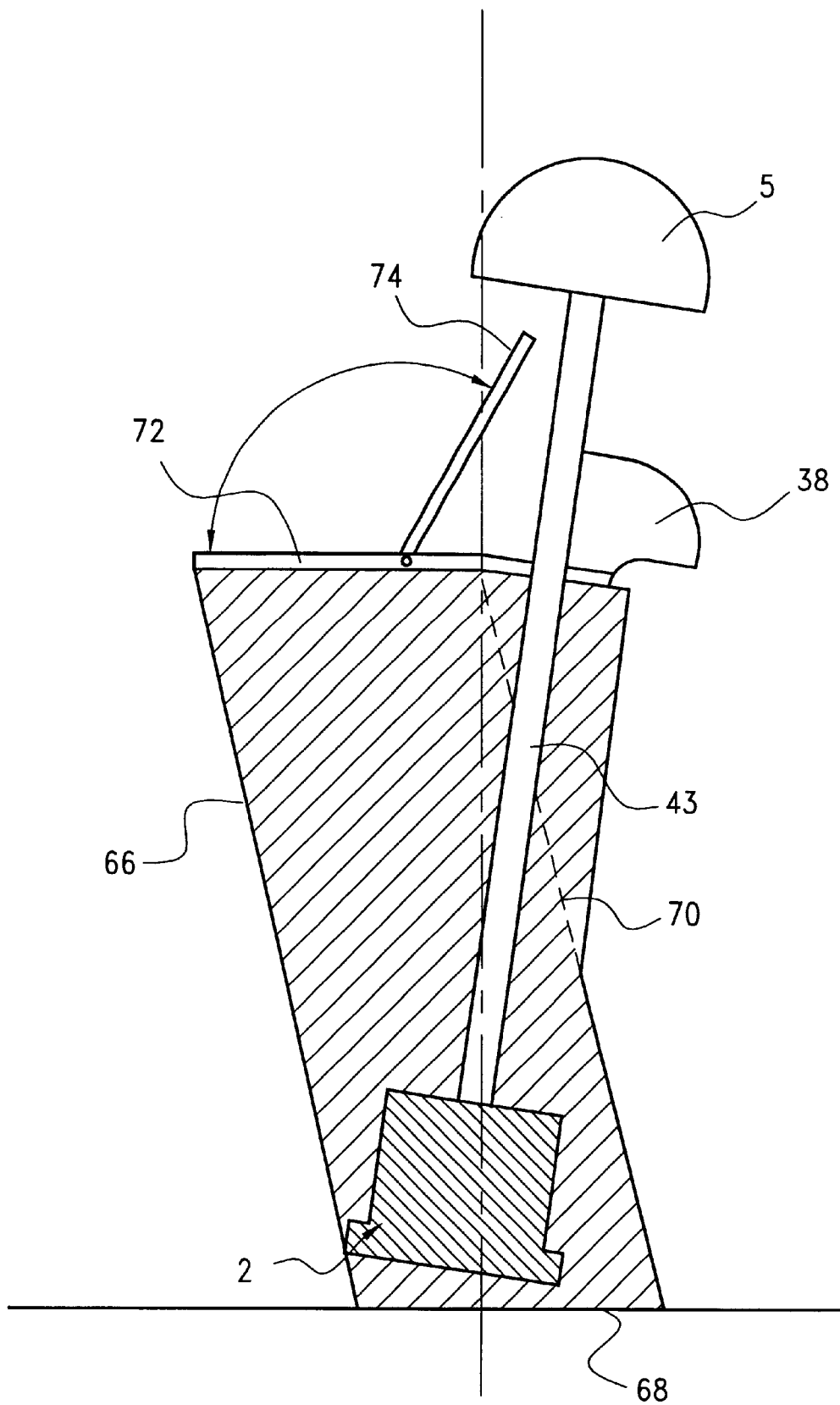

FIG. 12 shows a manual grinder with a cylindrical grinder housing 66 oblique for instance by 10°. The rigid drive shaft 43 passes at a slight slope, for instance 15°, through the wall portion 70, subtending an acute angle with the base surface 68, and is connected to the grinding unit 2 which also is mounted in oblique manner in the housing. This design makes it possible to utilize practically the full housing cross-section as the filling aperture 72 fitted with a flip-open lid 74. The design of the granularity adjusting device 17 appropriately is that of the embodiment of FIG. 9.

A special drive grip 80 will now be described in relation to FIGS. 9 and 10, said grip being T-shaped and a core 34 being displaceably received in the crossbar of said T configured as a unilaterally open tube 82. A crossbar 86 is affixed to the free end of said core 34. The post 88 of the T houses a ball 35 loaded by a spring 36 and cooperating with guide grooves 44 in the core. The core comprises detent recesses 45 to receive the ball at two sites corresponding to the extended and retracted positions of this core, said recesses 45 communicating with the guide grooves and being situated at said grooves' ends.

What is claimed is:

1. A manual grinder, comprising:
   a) a housing fitted with a sealable filling aperture for material to be ground;
   b) a grinding unit with adjustable grinding elements;
   c) the grinding unit being driven into rotation by a rotary grip and one of a flexible shaft and an articulating shaft mounted between the rotary grip and the grinding unit; and
   d) the flexible shaft being sufficiently flexible so that a user can use the rotary grip to move the flexible shaft relative to the grinding unit.

2. Manual grinder as claimed in claim 1, wherein:
   a) the rotary grip is an ergonomic rotary grip mounted at the side of the grinder housing.

3. Manual grinder as claimed in claim 1, wherein:
   a) a large grinding-material filling aperture is mounted separately from the grinding unit and can be sealed by a stopper-like cover.

4. Manual grinder as claimed in claim 1, wherein:
   a) the grinding unit comprises a cup-shaped casing for a set of grinding elements;
   b) a downwardly open set of grinding elements is mounted in said grinding unit;
   c) a movable element of said set of grinding elements is affixed to a drive shaft which passes through an upper sealing wall of the casing;
   d) the casing is fitted with apertures for the material to be ground and is supported in the upper sealing wall and is irrotationally affixed to the one of the flexible shaft and the articulating shaft.

5. Manual grinder as claimed in claim 4, wherein:
   a) an adapter fitted with a continuous borehole connects the drive shaft to the one of the flexible shaft and the articulating shaft;
   b) one end of said borehole includes an inside thread receiving a partly threaded portion of the drive shaft which can be irrotationally locked therein; and
   c) the other end of said borehole is irrotationally connected to the one of the flexible shaft and the articulating shaft.

6. Manual grinder as claimed in claim 5, wherein:
   a) the irrotational connection is implemented by means of a polygonal end of the one of the flexible shaft and the articulating shaft and by means of a matching polygonal borehole in the adapter, the irrotational connection being made by one of a press-fit, bonding, welding, and screws using a safety nut.

7. Manual grinder as claimed in claim 5, wherein:
   a) a safety nut implements the irrotational connection between the drive shaft and the adapter.

8. Manual grinder as claimed in claim 7, wherein:
   a) the safety nut can be locked by a safety pin to the drive shaft.

9. Manual grinder as claimed in claim 8, wherein:
   a) a stirrer arm is mounted to one of the adapter, the safety nut and the safety pin.

10. Manual grinder as claimed in claim 4, wherein:
   a) an adjusting device for setting a grinding gap of the set of grinding elements is mounted between the sealing wall of the casing and a safety nut.

11. Manual grinder as claimed in claim 10, wherein:
   a) the granularity adjusting device is driven by a lever irrotationally connected to a tube enclosing the drive shaft; and
   b) an elbow lever is affixed to this tube and in its operational position engages an adjusting lever of the second, upper element of the granularity adjusting device.

12. Manual grinder as claimed in claim 10, wherein:
   a) the adjusting device comprises a first element enclosing, with play, the drive shaft and being rigidly affixed to the sealing wall;
   b) a second, freely rotatable element mounted above the first element, resting on the safety nut and the first element, and enclosing, with play, the drive shaft; and
   c) mutually opposite annular surfaces of the first and second elements being mutually complementary, sequential, partly circular, equally shaped sloping surfaces configured in such manner that the width of the grinding gap can be adjusted by rotating the second, upper element.

13. Manual grinder as claimed in claim 12, wherein:
a) the second, upper element is fitted at its outside with axial, corrugated grooves entered by bosses of a leaf spring which partly encloses circumferentially the second element and is seated in a support connected to the casing of the set of grinding elements.

14. Manual grinder as claimed in claim 12, wherein:
a) said flexible shaft includes a rigid, central drive shaft; and
b) the granularity adjusting device is driven by a lever irrotationally joined to a cylindrical tube enclosing the drive shaft and fitted at its lower end with at least two pins engaging boreholes fitted into the second, upper element of the granularity adjusting device.

15. Manual grinder as claimed in claim 12, wherein
a) the set of grinding elements comprises a stationary grinding ring and a grinding cone configured within the grinding ring and rigidly affixed to the drive shaft engaged by the adjusting device.

16. Manual grinder as claimed in claim 15, wherein
a) a compression spring is mounted between the grinding cone and the sealing wall of the casing.

17. Manual grinder as claimed in claim 12, wherein
a) a drive lever projecting outward through a horizontal, guiding slot in the casing wall is connected to the second element of the adjusting device.

18. Manual grinder as claimed in claim 17, wherein
a) a pivoting range of the lever is less than 180°.

19. Manual grinder as claimed in claim 4, wherein:
a) a bush projecting into the casing of the set of grinding elements supports the drive shaft.

20. Manual grinder as claimed in claim 1, wherein:
a) a free-running device is mounted between the rotary grip and the one of the flexible shaft and the articulating shaft.

21. Manual grinder as claimed in claim 20, wherein:
a) the rotary grip is one of a drive crank and a rocker grip, and is pivotable about an axis into different positions.

22. Manual grinder as claimed in claim 1, wherein:
a) the housing includes an oblique cylinder;
b) the drive shaft passes through the outside of the housing subtending an acute angle with a base surface at a slope opposite the side; and
c) the grinding unit is mounted at a slope inside the housing corresponding to the slope of the drive shaft.

23. Manual grinder as claimed in claim 1, wherein:
a) the drive shaft is mounted eccentrically near the edge of the housing; and
b) a set of gears is provided to transmit drive action to the grinding unit.

24. Manual grinder as claimed in claim 1, wherein:
a) the grip includes a T-shape, a core, and a slidable, crossbar of said T-shape includes a unilaterally open tube;
b) the crossbar is mounted to one end of the crossbar of said grip;
c) a ball loaded by a spring is disposed in a post of the T of the grip, said ball cooperating with guide grooves and detent recesses present in the core.

\* \* \* \* \*